A. H. MERSHON.

Gas Fire-Logs.

No. 5,278.

Reissued Feb. 11, 1873.

Witnesses:
Jacob E. Schiedt.
Henry M. Wiedenkeim

Inventor:
Albert H. Mershon.
by John A. Wiedersheim
Atty.

AM. PHOTO-LITHOGRAPHIC CO. N.Y. (OSBORNE'S PROCESS.)

UNITED STATES PATENT OFFICE.

ALBERT H. MERSHON, OF PHILADELPHIA, PENNSYLVANIA, ASSIGNOR TO HIMSELF AND GEORGE B. MERSHON.

IMPROVEMENT IN GAS FIRE-LOGS.

Specification forming part of Letters Patent No. 126,473, dated May 7, 1872; reissue No. 5,278, dated February 11, 1873.

*To all whom it may concern:*

Be it known that I, ALBERT H. MERSHON, of the city and county of Philadelphia and State of Pennsylvania, have invented a new and useful Improvement in Gas-Heaters; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1:
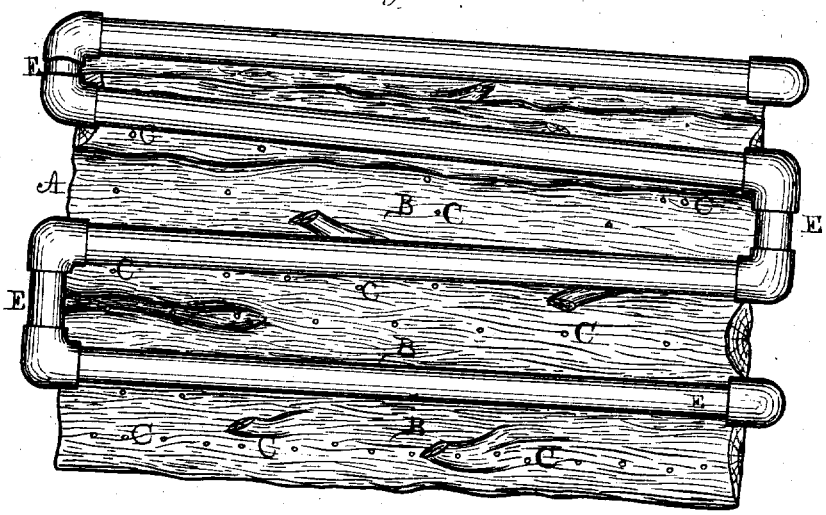
Figure 2:
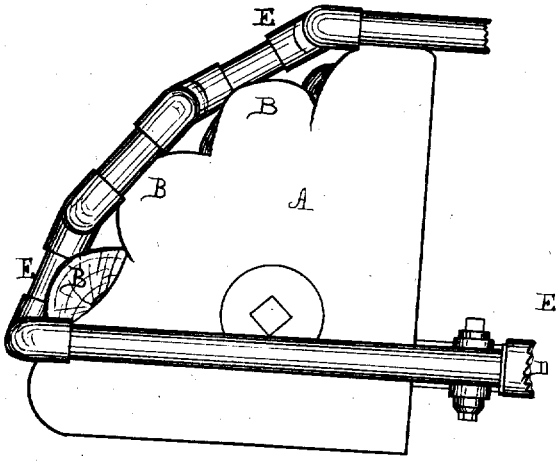
Figure 3:
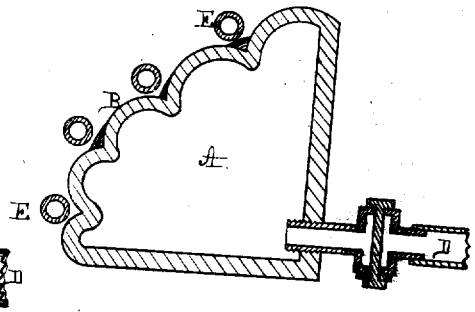

Figure 1 is a front view of the device embodying my invention. Fig. 2 is a side view thereof. Fig. 3 is a transverse vertical section thereof.

Similar letters of reference indicate corresponding parts in the several figures.

This invention relates to an improvement in the class of gas-heaters which are denominated "French gas-logs."

These heaters have been constructed of terra-cotta or clay ware, and have their faces or front sides perforated and formed to resemble logs of wood, with applied splints of asbestus, which become incandescent when in use, so that, when gas is turned into the heaters and ignited at the perforations, numerous gas-jets are produced, which combine in such a manner as to present the appearance of wood-fire, and the result is a serviceable, cheerful, and ventilating fire.

Now, while this idea is extremely practical and useful, the material of which the logs are constructed is such that the logs are exceedingly fragile, consume much material in manufacture, and are thus expensive, require careful handling, crack with the heat, and do not retain heat, all of which are serious objections.

My invention is designed to remedy the aforesaid defects, and consists in forming a gas-heater of a metallic body, constructed with a face extending from the highest point, which is at or about the back, in a sloping or curved form, so as to present a heating-surface on the front or on the sloping part facing the apartment, and having numerous perforations through which the gas escapes, which when ignited unites or combines and produces a powerful and cheerful fire, and said face is formed with curved or angular corrugations, or both, to increase the heating-surface, and present an ornamental and attractive appearance in imitation of a fire of wood, coal, or other fuel. The invention finally consists in combining with the gas-heater means for producing hot water and steam.

Referring to the drawing, A represents a heater, into which gas is introduced from an ordinary gas pipe or fixture or other place of supply. This heater is constructed of a hollow metallic body, and having its face B extend from the highest point, which is at or about the back, in a sloping or curved form, so as to present a heating-surface on the front or on the sloping part facing the apartment in which the heater is located. This face has numerous perforations C, which afford means of escape of gas on said face, where it will be consumed, and said perforations or gas-jets will be made in various portions of the face, so that when the gas is ignited it will combine in burning and form a broad flame, thus producing a powerful heat, which will be retained in the body, owing to the nature of the material of which it is composed, and then thrown into the apartment in a large volume and to a great distance. Since every part of the body becomes heated, combustion of the gas will be assisted, inasmuch as the gas is warmed before it escapes at the jets C.

The body can be readily constructed so that there will be no escape of gas at the joints, and no liability of the parts to separate, break, or crack, as is the case with terra-cotta or clay ware. The body may be made of light material, and is thus easily and conveniently handled, especially in transportation, and otherwise obviates the necessity of great carefulness in laying or setting down.

The gas may be introduced through a pipe, D, by means of a flexible tube or other suitable conveyer attached to the gas-fixture or other place of supply.

In order to increase the heating-surface the face B is formed with curved or angular corrugations, or both, and otherwise made in imitation of logs of wood, pieces of coal, or other fuel, to present, when the gas is ignited, the appearance of a fire of such fuel, which is alike ornamental and attractive.

If desired, the entire body, as heretofore stated, may be cast in one piece of metal.

E represents a pipe, which may consist of a coil or a number of pipes communicating with each other, and said pipe may be arranged on the front face of the heater, "let in" flush therewith, or formed with the face B, if the latter is made of cast metal.

Water is passed into the pipe from any source and will be heated by the burning jets of the heater, whereby there is furnished means for obtaining hot water and steam for various purposes.

Having thus described my invention, what I claim as new, and desire to secure by Letters Patent, is—

1. The gas-heater, constructed of a metallic body, having a face sloping or curved, as stated, in connection with perforations in and corrugations on said face, so as to form a heating-surface on the front or toward the apartment, as set forth, and for the purpose specified.

2. In combination with a gas-heater, mechanism for obtaining hot water and steam, substantially as set forth.

To the above I have signed my name this 19th day of October, 1872.

Witnesses: A. H. MERSHON.

JOHN A. WIEDERSHEIM,

HARRY M. WIEDERSHEIM.